United States Patent
Begemann et al.

(10) Patent No.: US 7,278,842 B2
(45) Date of Patent: Oct. 9, 2007

(54) APPARATUS FOR THE PRODUCTION OF POLYURETHANE SANDWICH ELEMENTS

(75) Inventors: Michael Begemann, Freundenberg/Lintach (DE); Jürgen Wirth, Köln (DE); Reiner Raffel, Siegburg (DE)

(73) Assignee: Hennecke GmbH, Leverkusen (DE)

( * ) Notice: Subject to any disclaimer, the term of this patent is extended or adjusted under 35 U.S.C. 154(b) by 504 days.

(21) Appl. No.: 10/942,663

(22) Filed: Sep. 16, 2004

(65) Prior Publication Data
US 2005/0087283 A1 Apr. 28, 2005

(30) Foreign Application Priority Data
Sep. 22, 2003 (DE) ............... 103 43 745

(51) Int. Cl.
B29B 44/20 (2006.01)
B29C 44/46 (2006.01)

(52) U.S. Cl. ..................................... 425/4 C

(58) Field of Classification Search ............ None
See application file for complete search history.

(56) References Cited

U.S. PATENT DOCUMENTS

| | | | | |
|---|---|---|---|---|
| 3,174,887 A | * | 3/1965 | Voelker ........................ | 156/79 |
| 3,341,638 A | * | 9/1967 | Helmut ........................ | 264/415 |
| 3,793,122 A | * | 2/1974 | Sullhofer ...................... | 156/537 |
| 4,035,529 A | | 7/1977 | Meisert et al. ............... | 427/244 |
| 4,264,291 A | | 4/1981 | Hoffman et al. ............. | 425/224 |
| 4,925,719 A | | 5/1990 | Staneluis et al. ............. | 428/71 |
| 5,856,371 A | * | 1/1999 | Grimm et al. ............... | 521/159 |
| 6,042,765 A | | 3/2000 | Sugahara et al. ........... | 264/46.1 |
| RE36,674 E | * | 4/2000 | Gluck et al. ............. | 428/308.4 |
| 6,228,296 B1 | | 5/2001 | Cartmill et al. ............ | 264/46.2 |

FOREIGN PATENT DOCUMENTS

| | | |
|---|---|---|
| DE | 1 167 520 | 4/1964 |
| DE | 23 30 678 | 1/1975 |
| DE | 197 27 129 A1 | 1/1999 |
| EP | 940 249 | 9/1999 |
| FR | 2003281 | 11/1969 |
| GB | 1 369 641 | 10/1974 |
| WO | 00/03858 | 1/2000 |

OTHER PUBLICATIONS

Patent Abstracts of Japan Bd. 0071, Nr. 73 (M-232), Jul. 30, 1983 & JP 58 076239 A (Matsushita Denko KK), May 9, 1983 (Jul. 30, 1983).
Gellhorn Van E: "Sandwich Structure Success Depends on Process Conformity with Requirements" Composites Manufacturing, Butterworth Scientific, Guildford, Surrey, GB, Bd. 3, Nr. 3, Jan. 1992, Seiten 183-188, XP000349832.

* cited by examiner

*Primary Examiner*—Richard Crispino
*Assistant Examiner*—Barbara J. Musser
(74) *Attorney, Agent, or Firm*—Lyndanne M. Whalen; N. Denise Brown

(57) ABSTRACT

The present invention relates to a process for the continuous production of polyurethane sandwich elements comprising an upper outer layer and a lower outer layer and a layer of cellular polyurethane lying in between, which is firmly bonded to the outer layers. This invention also relates to an apparatus suitable for the production of polyurethane sandwich elements as described above.

10 Claims, 5 Drawing Sheets

APPARATUS FOR THE PRODUCTION OF POLYURETHANE SANDWICH ELEMENTS

BACKGROUND OF THE INVENTION

The present invention relates to a process for the production of polyurethane sandwich elements (so-called panels) in which the polyurethane reaction mixture is applied both to the upper and to the lower outer layer, and then the outer layers which are wetted with polyurethane reaction mixture are brought into contact with one another. This invention also relates to an apparatus for the production of these polyurethane sandwich elements (i.e. panels).

Polyurethane sandwich elements (i.e. panels) are, in general, produced by a continuous process. In this process, the panels are produced as a continuous product on so-called Contimats in thicknesses of, as a rule, approx. 20 to 200 mm. However, thicknesses of less than 20 mm and of more than 200 mm are also possible. Such a Contimat in this context conventionally comprises a circulating upper belt for guiding the upper outer layer and a circulating lower belt for guiding the lower outer layer, a feed device for the upper outer layer, a feed device for the lower outer layer, a shaping zone within which the polyurethane reaction mixture foams and reacts between the upper outer layer and the lower outer layer, a length-cutting device for the panel produced, and a metering station with a mixing head for application of the polyurethane reaction mixture to the lower outer layer. A Contimat according to the prior art is shown in FIG. 1.

In the case of panels with sheet metal outer layers, a polyurethane layer with a bulk density of 45±5 kg/m$^3$ is conventionally present between the upper and the lower outer layer. However, it is desirable in this context to establish the lowest possible bulk densities of, for example, 40 kg/m$^3$ or, for example, of even only 38 kg/m$^3$, in order to minimize the amount of starting substances consumed.

For various reasons, however, technical problems arise here. On the one hand, the complete filling of the canted edge zones of sheet metal outer layers is inadequate at a low bulk density. On the other hand, in the case of thin panels, such as, for example 20 mm thick, the distribution of the polyurethane reaction mixture is not uniform at a low bulk density. This is particularly a problem at a relatively high belt speed of, for example, above 30 m/min. In both cases, panels of lesser quality or waste consequently result. A further problem is the low adhesion between the polyurethane foam and the upper sheet metal outer layer at low bulk densities. This, in turn, can lead to panels of lesser quality or waste.

To avoid problems such as these, the panels are typically produced with increased bulk densities of conventionally 45 to 50 kg/m$^3$, i.e. the so-called "overpacking" technique. In "overpacking", the material flow of polyol, isocyanate, and blowing agent, and thus of polyurethane foam are increased, and the foaming pressure is also increased. This results in the adequate filling of the canted edge zones. The increased foaming pressure results here from the increased amounts of polyurethane reaction mixture and blowing agent, which leads to foaming of the polyurethane foam, and therefore to a build up of pressure in the closed-off space between the upper outer layer and the lower outer layer in the shaping zone. At a higher material flow, the distribution of the polyurethane reaction mixture on the lower outer layer is, of course, also better. The adhesion of the polyurethane reaction mixture to the upper sheet metal outer layer is likewise improved by the higher material flow, but above all by the higher foaming pressure.

SUMMARY OF THE INVENTION

The object of the present invention is to provide a simple and economical process and a suitable apparatus for the production of polyurethane sandwich elements with low bulk densities of, for example, 38 to 40 kg/m$^3$.

The present invention relates to a process for the continuous production of polyurethane sandwich elements comprising an upper outer layer, a lower outer layer, and a layer of cellular polyurethane lying in between the upper and lower outer layers, and which is firmly bonded to the upper and lower outer layers. This process comprises a) continuously conveying the two outer layers in the longitudinal direction such that a gap extending in the longitudinal direction of the outer layers is formed between the outer layers, b) applying the polyurethane reaction mixture pro rata from above to the upper side of the lower outer layer and from the below to the under-side of the upper outer layer, c) feeding the outer layers with the polyurethane reaction mixture into a shaping zone in which the thickness of the polyurethane sandwich element is established and in which the polyurethane reaction mixture reacts, and d) removing the resultant polyurethane sandwich element off the conveying means.

In this process, the ratio of the material flow of the polyurethane reaction mixture applied to the upper outer layer to the material flow of the polyurethane reaction mixture applied to the lower outer layer is between 0.001:1 and 0.2:1, preferably between 0.002:1 and 0.1:1 and most preferably between 0.005:1 and 0.05:1.

DETAILED DESCRIPTION OF THE INVENTION

Figure 1:
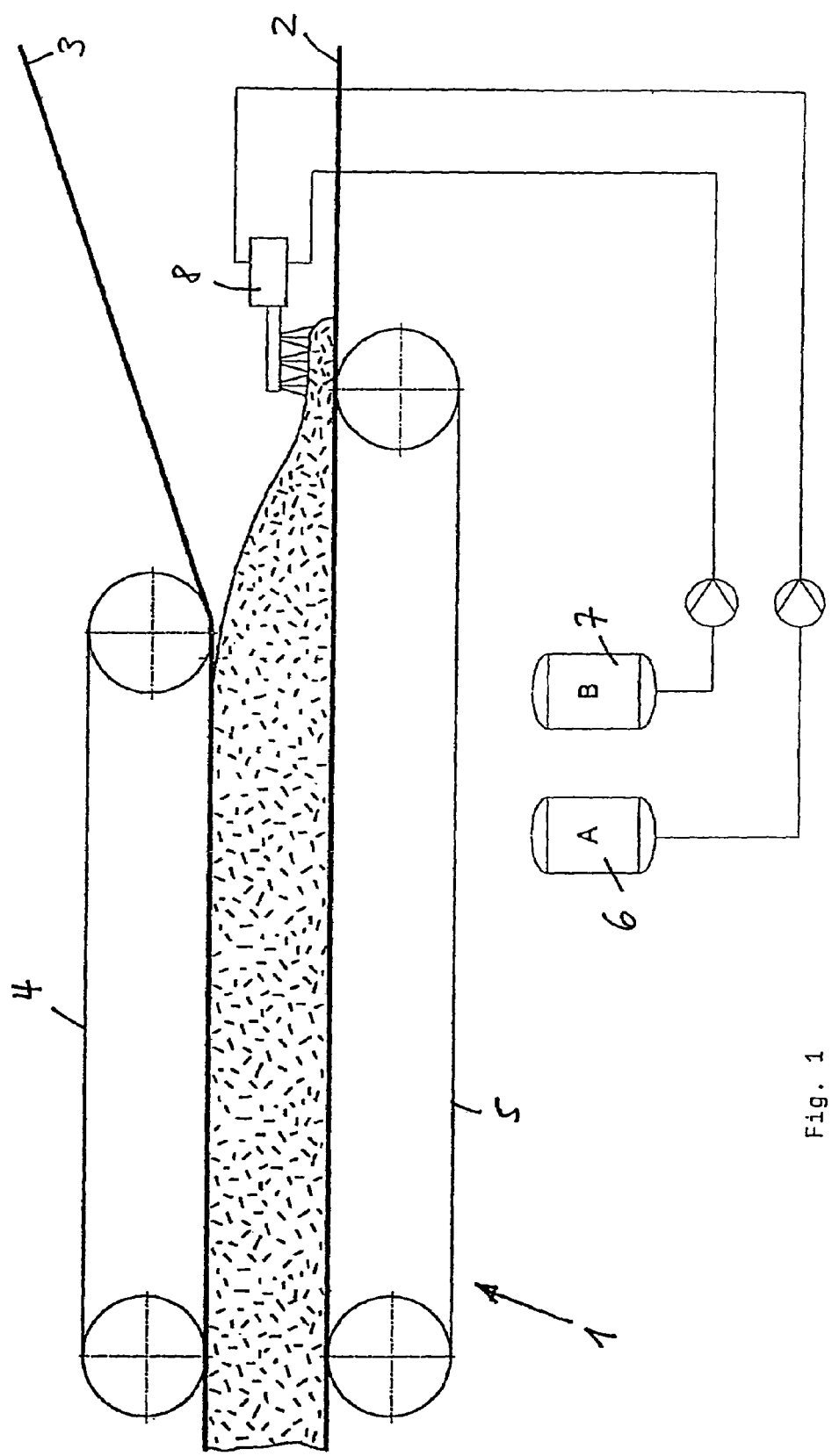
FIG. 1 shows a side view of a typical prior art device/apparatus for the production of polyurethane sandwich elements.

In the process according to the present invention, the liquid polyurethane reaction mixture is applied to the lower outer layer as in conventional processes, and also to the upper outer layer. This results in the canted edge zones also being filled completely in the upper metal sheet. At the same time, a non-uniform distribution of the polyurethane reaction mixture on the lower outer layer is compensated for. The adhesion of the polyurethane foam to the upper outer layer is improved decisively by the liquid wetting.

The material ratio of the polyurethane reaction mixture applied to the upper outer layer and to the lower outer layer, and therefore, the thickness of the film of polyurethane reaction mixture applied to the under-side of the upper outer layer are of decisive importance for the process according to the invention. The thickness of the film must be chosen according to the forces of adhesion and cohesion, such that dripping of the polyurethane reaction mixture from the upper outer layer on to the lower outer layer is avoided. If this is not the case, defects in the panel occur and waste results.

The film thicknesses preferably produced in the liquid polyurethane reaction mixture applied to the under-side of the upper outer layer are in the range from 10 to 450 µm, more preferably in the range from 50 to 300 µm, and most preferably in the range from 100 to 200 µm. These thicknesses can be increased by a factor of 1.5 to 5 if the polyurethane reaction mixture is frothed. A frothed polyurethane reaction mixture comprises, for example, 0.1 to 4 parts by weight of $CO_2$ per 100 parts of polyurethane reaction mixture.

To ensure complete adhesion, the surfaces in contact with the polyurethane reaction mixture are preferably cleaned and degreased before application of the polyurethane reaction mixture. To increase the forces of adhesion still further, an additional chemical or electrochemical pre-treatment, or the application of an adhesion promotor before application of the polyurethane reaction mixture is also possible.

Polyurethane sandwich elements (panels) often have highly structured lower outer layers, and, when and/or where appropriate, also upper outer layers. In this case, the outer layers provided with deeper structures are in principle fed at the bottom in the processes for the production of the panels, so that the polyurethane reaction mixture penetrates easily into the structures by the influence of gravity and can fill these completely. By the process according to the invention, it is now also possible for the surfaces present in the upper outer layer to be filled completely with the polyurethane reaction mixture before the upper and lower outer layers are brought together in the shaping zone.

In a preferred embodiment, the polyurethane reaction mixture is applied to the upper outer layer with a spray mixing head, and the spray zone is demarcated by films or paper webs so that the scattered mist which forms is collected. The spray zone here is the space below the upper outer layer, in which the scattered mists arises from the spraying form. The films or paper webs here are arranged substantially planar-parallel to the upper outer layer. In other words, the films or paper webs are located in planes that are parallel to the upper outer layer. It is particularly preferred that one film or paper web is located in the plane above (and parallel to) the upper outer layer and another film or paper web is located in the plane below (and parallel to) the upper outer layer. By placing one film or paper web above and another one below the upper outer layer, the spray zone is demarcated. The films or paper webs are preferably moved at an average advance of 0.1 to 10 m/h, more preferably 0.1 to 5 m/h and most preferably 0.1 to 3 m/h. As previously stated, the films or paper webs are in planes that are parallel to the upper outer layer. These films or paper webs preferably perpendicularly to the direction of movement of the upper outer layer. The scattered aerosols or scattered mists are preferably sucked off here at the narrow sides of the spray zone by suitable suction devices.

The spray mixing head preferably oscillates transversely to the direction of movement of the upper outer layer. At relatively low transportation speeds (i.e. <30 m/min) of the outer layers, the spray mixing head can traverse the entire width of the spray region. At higher transportation speeds of the outer layers, however, the accelerations in the turning points become very high.

Thus, the translatory distance covered by the spray mixing head transversely to the direction of movement of the upper outer layer can preferably be adjusted. The spray mixing head preferably oscillates only in a shortened range which can be adjusted, for example, by or on a linear scale. At the end points of the distance covered, the spray mixing head is swivelled outwards in the direction of the distance covered, so that the edge regions of the upper outer layer are also sprayed, without the spray mixing head having to travel to the edge of the upper outer layer.

The canted edges, such as occur, for example, with sheet metal outer layers, are therefore covered in the present case, before applying the polyurethane reaction mixture by a protective film. This film is peeled off after the panel has been finished.

As a rule, a polyurethane reaction mixture of the same composition is applied to both the lower and to the upper outer layers. The mixing heads assigned to the upper and the lower outer layers can then be supplied with the reacting components of isocyanate and polyol from the same working tanks. Two variations are possible in this context. Either each mixing head and each component is provided with its own metering pump, or both mixing heads are supplied by a common metering pump for one component, with the material flows then being adjusted for each mixing head by a flow divider downstream of the metering pump. It is preferred that the metering pumps and the flow dividers are adjustable.

Toothed wheel flow dividers are suitable, for example, to be employed as the flow dividers.

One or more auxiliary substances can also be injected into the reaction components before they are mixed. For example, a catalyst can be added into the polyol component which is being conveyed to the mixing head assigned to the lower outer layer, in order to influence the rate of the polyurethane reaction on the lower outer layer. This makes it is possible to accelerate the rate of the formation of polyurethane on the lower outer layer in comparison to the rate of formation of polyurethane on the upper outer layer.

It is preferred, and in some cases may be necessary, to accelerate the rate of formation of polyurethane on the lower outer layer. One reason for this may be that the angle formed by the upper and the lower outer layer on entry into the shaping zone is as a rule relative small, e.g. the angle may be 5-40°. Therefore, for construction reasons, the two mixing heads must be arranged one after the other. As a rule, in this context the mixing head with which the upper outer layer is charged with polyurethane reaction mixture is arranged, in the direction of transportation of the outer layers, before the mixing head with which the lower outer layer is charged with polyurethane reaction mixture. In order to achieve reaction and foaming of the polyurethane reaction mixtures on the upper and the lower outer layer at about the same time, the reaction of the polyurethane reaction mixture on the lower outer layer must, therefore, generally be accelerated.

In a particularly preferred embodiment of the process, the start times (also commonly referred to as lay times or cream time) of the polyurethane reaction mixtures on the upper and the lower outer layers are adjusted. These are typically adjusted such that the polyurethane reaction mixture on the upper outer layer starts about when the foam formed from the polyurethane reaction mixture on the lower outer layer reaches the polyurethane reaction mixture on the upper outer layer.

The entire spray region, that is to say the spray mixing head assigned to the upper outer layer and, where appropriate, the films or paper webs, can be moved away or swivelled away during production pauses and/or after the end of production.

In an alternative embodiment, the polyurethane reaction mixture can be applied to the upper outer layer by the dipping process. This process is particularly advantageous when flat upper outer layers are used, because the polyurethane reaction mixture can then be applied to the upper outer layer in a thin film. In this case the edges of the upper outer layers must initially be masked with a protective film. The protective films are typically peeled off before bringing together the upper outer layer with the lower outer layer.

Furthermore, the present invention relates to a device or apparatus for the continuous production of polyurethane sandwich elements comprising an upper outer layer, a lower outer layer and a layer of cellular polyurethane lying in between the upper outer layer and the lower outer layer, and which is firmly bonded to the upper and lower outer layers. This apparatus comprises a circulating upper belt for guiding the upper outer layer, a circulating lower belt for guiding the lower outer layer, a feed device for feeding the upper outer layer onto the circulating upper belt, a feed device for feeding the lower outer layer onto the circulating lower belt, optionally a length-cutting device for the polyurethane sandwich element, a first mixing head arranged above the lower outer layer for application of the polyurethane reaction mixture to the lower outer layer and a second mixing head arranged below the upper outer layer for application of the polyurethane reaction mixture to the upper outer layer, a metering device for metering the reaction components to the first mixing head, to the second mixing head, and to the lines between the metering device and the first and the second mixing heads. It is preferred that the second mixing head is a spray mixing head, and the spray zone in which the scattered mists caused by the spraying form are demarcated from the environment by films or paper webs.

A spray mixing head which is arranged below the upper outer layer and the discharge channel and spray nozzle of which are directed against the under-side of the upper outer layer is preferably employed as the second mixing head. It is also possible, in principle, also to charge the upper outer layer with polyurethane reaction mixture from the top. However, since the surface structures which are often present in the upper top layer (crimping) severely limit the flexibility of the upper outer layer. These surface structures make the upper outer layer rigid, and thus, the upper outer layer can no longer be deflected when such surface structures are present. In the present invention, provision is therefore made, to spray the upper outer layer with polyurethane reaction mixture with a spray mixing head from the bottom. The device according to the invention can therefore be employed very flexibly for smooth upper outer layers and for surface-structured upper outer layers. The use of a spray mixing head in the present invention results in the upper outer layer being coated very uniformly and homogeneously.

Spray mixing heads are distinguished in that the polyurethane reaction mixture to be discharged can be atomized and discharged at an increased speed by them. The spray mixing heads, in this context, in general have a mixing device with which the polyurethane reaction components to be mixed can be mixed. Suitable mixing devices include, for example, stirrer mixers, nozzle mixers, counter-current injection mixers or static mixers. A spray device such as, for example a spray nozzle, is arranged downstream of the mixing device. In this context both spray nozzles which are operated without air assistance and spray nozzles in which air or nitrogen can be admixed to the polyurethane reaction mixture before the spray nozzle are suitable. Spraying is assisted by the gas expansion which then develops behind such spray nozzles. However, spraying with air or nitrogen, in particular, leads to an increased aerosol formation. However, above approx. 500 mPas, spraying practically only with air or nitrogen assistance is possible.

During spraying of the polyurethane reaction mixture, scattered aerosols or scattered mists are formed. These spread in the environment and lead to severe contamination in the long term. For this reason, the spray zone in which the scattered mists caused by the spraying is demarcated from the environment by films or paper webs.

The films or paper webs can be, and preferably are, moved continuously or intermittently with an average advance of 0.1 to 10 m/h. The direction of movement of the films or paper webs is preferably perpendicular to the direction of movement of the upper outer layer.

It is also preferable that the films or paper webs are arranged such that they are parallel to, or substantially parallel, to the upper outer layer. In other words, these films or paper webs are in a plane that is parallel to or substantially parallel to the plane the upper outer layer resides in. There are preferably two films or paper webs, one being above the upper outer layer and one being below the upper outer layer. In addition, suction devices are preferably arranged at the open narrow sides of the spray zone. These suction devices are preferably located below the upper outer layer but above the film or paper web which is below the upper outer layer. The films or paper webs arranged approximately parallel to the upper outer layer and the suction devices arranged at the narrow sides of the spray zone thus form a spray booth which is demarcated from the environment in all spatial directions.

In one advantageous embodiment of the invention, the second mixing head can be oscillated transversely to the direction of movement of the upper outer layer, with it being possible to adjust the translatory distance covered by the second mixing head. This adjustment to the distant covered can be, e.g. by means of a linear scale. In addition, the second mixing head can also preferably be swivelled outwards in the direction of the distance covered at the end points of the distance covered, so that during spraying the edge regions of the upper outer layer can also be sprayed, without the spray mixing head having to move to the edge of the upper outer layer.

In a further embodiment, the second mixing head and the films or paper webs with which the spray region is limited can be moved away or swivelled away.

Preferably, the metering device contains, for each reaction component, only one common metering unit with which the reaction component is conveyed to the first and to the second mixing heads, and one flow distributor with which the metered material flow of reaction component is distributed to the first and the second mixing heads. The metering units such as, for example metering pumps, and the flow distributors are preferably adjustable.

Toothed wheel flow distributors can, for example, be employed as the flow distributors.

In one embodiment of the process, a means for passing in or injection of additional auxiliary substances are arranged in the lines between the metering device and the first and/or the second mixing heads. Pressure or servo-controlled nozzles or simple valves, for example, are suitable. Here, it is essential that they guarantee complete closure of the injection point when metering is stopped. A catalyst, for example, can thus be added to the polyol component in order to influence the rate of the polyurethane reaction.

DETAILED DESCRIPTION OF THE FIGURES

Reference will now be made to the figures to more clearly define the apparatus.

FIG. 1 illustrates a prior art device 1 for the production of polyurethane sandwich elements as is known and described in the prior art. FIG. 1 is a side-view of a prior art apparatus. In this apparatus, a lower outer layer 2 and an upper outer layer 3 are conveyed continuously by corresponding upper and lower feed devices (not shown) into the gap which extends in the longitudinal direction between the circulating upper belt 4 and the circulating lower belt 5, the so-called shaping zone, and guided therein.

The polyol component A and the isocyanate component B are conveyed from the respectively assigned working tanks 6 and 7 via assigned pumps and lines to the mixing head 8 where they are mixed. The polyurethane reaction mixture formed by this mixing is applied to the lower outer layer 2 by the mixing head 8 as it is traversing over the width of the lower outer layer 2 transversely to the direction of transportation of the lower outer layer 2. The polyurethane reaction mixture applied to the lower outer layer 2 foams and is transported by the longitudinal movement of the lower outer layer 2 into the shaping zone which is spanned by the circulating upper belt 4 and the circulating lower belt 5. In the shaping zone, the polyurethane reaction mixture between the upper outer layer 3 and the lower outer layer 2 foams and reacts, so that after passing through the shaping zone a polyurethane sandwich element is obtained, which can optionally then be cut to any desired length and worked further.

Figure 2:
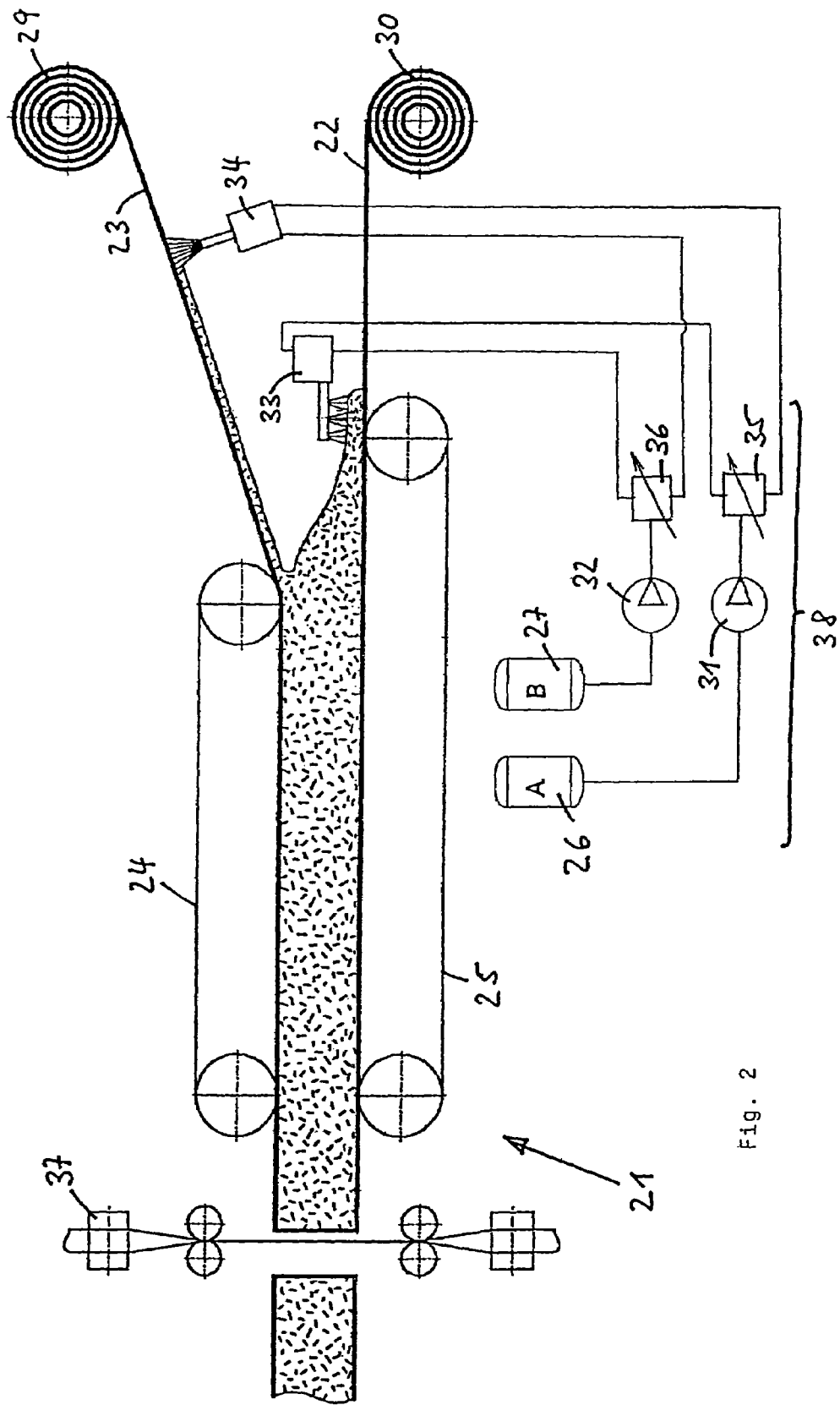
FIG. 2 shows a side view of a device or apparatus according to the invention, for the production of polyurethane sandwich elements in which the second mixing head is a spray mixing head.

Reference will now be made to FIG. 2, a side view in elevation of an apparatus which illustrates an embodiment of the present invention. FIG. 2 illustrates an apparatus 21 suitable for carrying out the process according to the present invention for the production of polyurethane sandwich elements, in which the upper outer layer 23 is sprayed with polyurethane reaction mixture with a spray mixing head 34. In this embodiment, the lower outer layer 22 and the upper outer layer 23 are being conveyed continuously by correspondingly assigned feed devices 29 and 30 into the gap extending in the longitudinal direction between the circulating upper belt 24 and the circulating lower belt 25, and are guided therein.

The polyol component A and the isocyanate component B are conveyed from the respective working tanks 26 and 27 via respective pumps 31 and 32 and corresponding lines to the mixing head 33 which is assigned to the lower outer layer and to the mixing head 34 which is assigned to the upper outer layer. In each case, the polyol component and isocyanate component are mixed in the mixing heads, and the polyurethane reaction mixture thereby formed is applied to the lower outer layer 22 and to the upper outer layer 23. The mixing head 34 is constructed here as a spray mixing head. Conveying of the components is effected here in a manner such that component A is conveyed by the pump 31 to an adjustable flow distributor 35, where it is divided into the set ratio there, and is fed via correspondingly assigned lines to the lower mixing head 33 and to the upper mixing head 34. In an analogous manner, component B is conveyed by metering pump 32 to the adjustable flow distributor 36, divided there into the set ratio, and fed to the upper and lower mixing heads 33 and 34.

The polyurethane reaction mixture applied to the lower outer layer 22 and the upper outer layer 23 foams and is transported by the longitudinal movement of the outer layers 22 and 23 into the shaping zone, which is spanned by the circulating upper belt 24 and the circulating lower belt 25.

In the shaping zone, the polyurethane reaction mixture between the upper outer layer 23 and the lower outer layer 22 foams and reacts, so that after passing through the shaping zone a polyurethane sandwich element is obtained. This resultant polyurethane sandwich element can then be cut (if desired) to the desired length in the length-cutting device 37.

Figure 3:
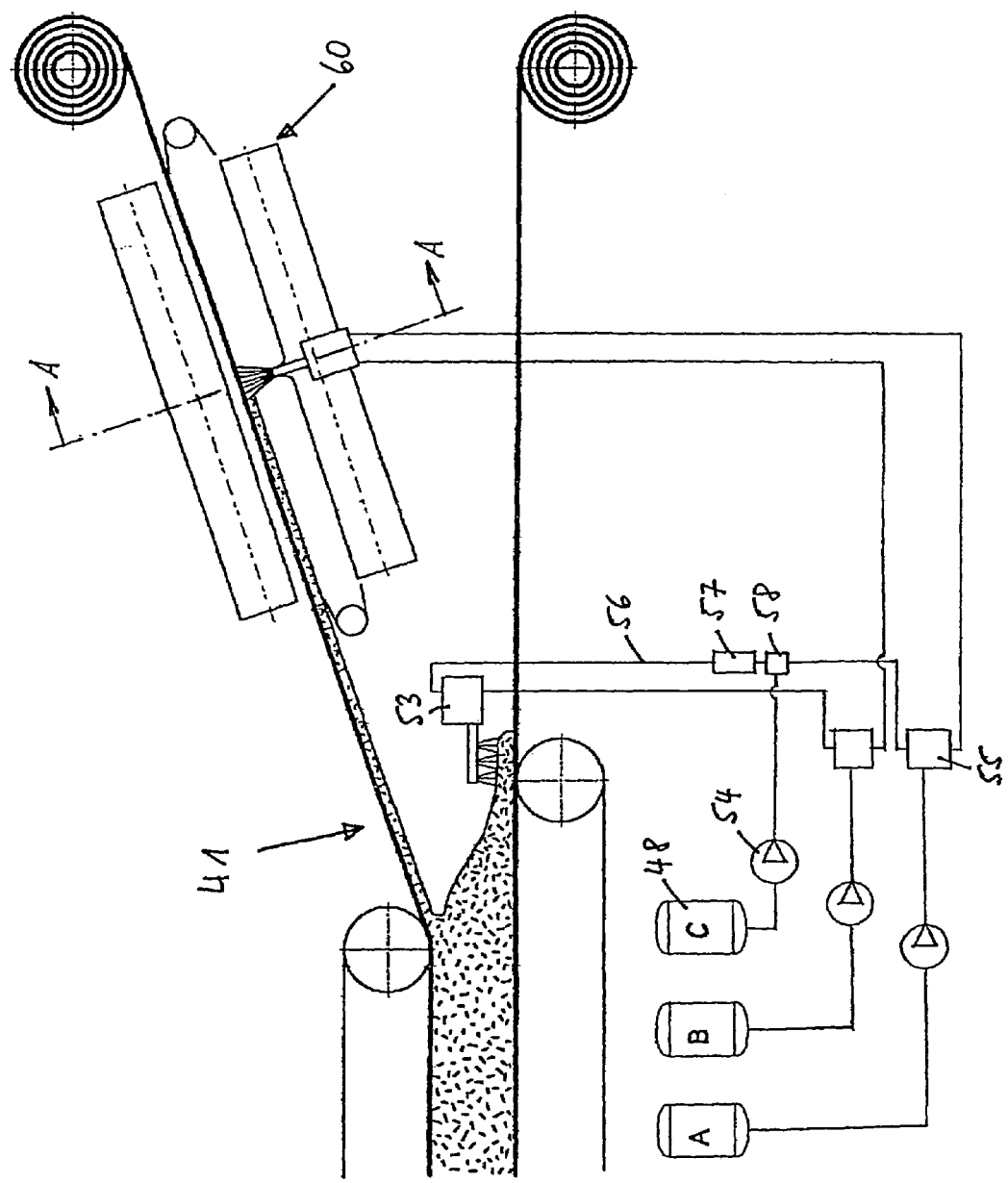
FIG. 3 shows a side view of a device or apparatus according to the present invention for the production of polyurethane sandwich elements in which the second mixing head is a spray mixing head and the spray zone is limited by a mobile spray booth.

Reference will now be made to FIG. 3 which illustrates a side view of an advantageous embodiment of the apparatus as shown in FIG. 2. The apparatus 41 according to the invention additionally comprises a reservoir tank 48 for an auxiliary substance C which may be, for example, a catalyst. The auxiliary substance C is metered via metering pump 54 into the line 56 which runs between the flow distributor 55 for component A and the mixing head 53 which is assigned to the lower outer layer. This auxiliary substance C is mixed into component A in the line 56 by means of the static mixer 57. The auxiliary substance C is introduced into the line 56 here, for example, by means of a servo-controlled nozzle 58. In addition, FIG. 3 shows the mobile spray booth 60 by which the spray zone in which the scattered mists caused by the spraying are formed are demarcated from the environment by films or paper webs. The mobile spray booth 60 is shown in detail in FIG. 4 (section A-A in FIG. 3) and in FIG. 5 (section B-B in FIG. 4).

Figure 4:
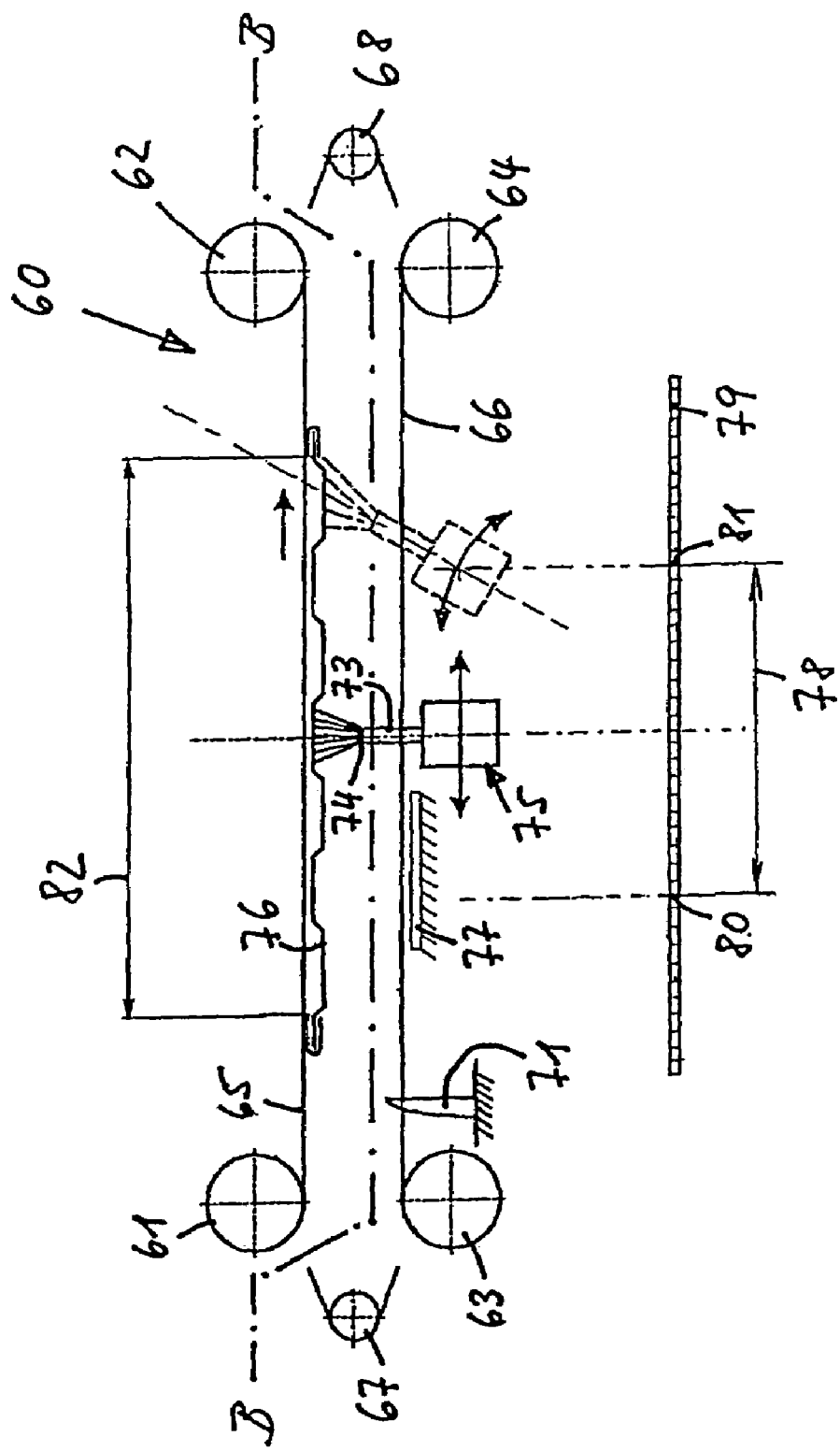
FIG. 4 shows a cross-section at plane A-A in FIG. 3 through the mobile spray booth.

Reference will now be made to FIG. 4 which illustrates the cross-section along plane A-A of the spray booth 60 shown in FIG. 3. The spray booth 60 has an upper wind-off roller 61 and a lower wind-off roller 63, and an upper wind-up roller 62 and a lower wind-up roller 64 for the upper and lower films or paper webs 65, and, respectively. Suction devices 67 and 68 which suck up the scattered aerosols formed during spraying, are arranged at the narrow sides of the mobile spray booth 60.

The lower film or paper web 66 is separated approximately in the middle by means of a fixed blade 71, so that a slit (shown as slit 72 in FIG. 5) is formed, through which the discharge tube 73 and the spray nozzle 74 of the mixing head 75 can oscillate. While the upper film or paper web 65 can be supported on the upper outer layer 76, additional supports 77 are attached for the lower slit film or paper web 66. The upper film or paper web 65 does not necessarily touch the upper outer layer 76. As described previously in a preferred embodiment, the upper film or paper web 65 is preferably in a plane located parallel (or substantially parallel) to the plane in which the upper outer layer 76 is located.

The oscillation range 78 of the spray mixing head 75 can be adjusted by means of a linear scale 79. Suitable swivelling devices (not shown) with which the mixing head 75 can be swivelled outwards in order to spray the entire spray region 82 are provided at the left-hand and right-hand limits, 80 and 81, respectively, of the oscillation range 78. The left-hand and right-hand limits 80 and 81 represent the turning points of the spray mixing head 75.

Figure 5:
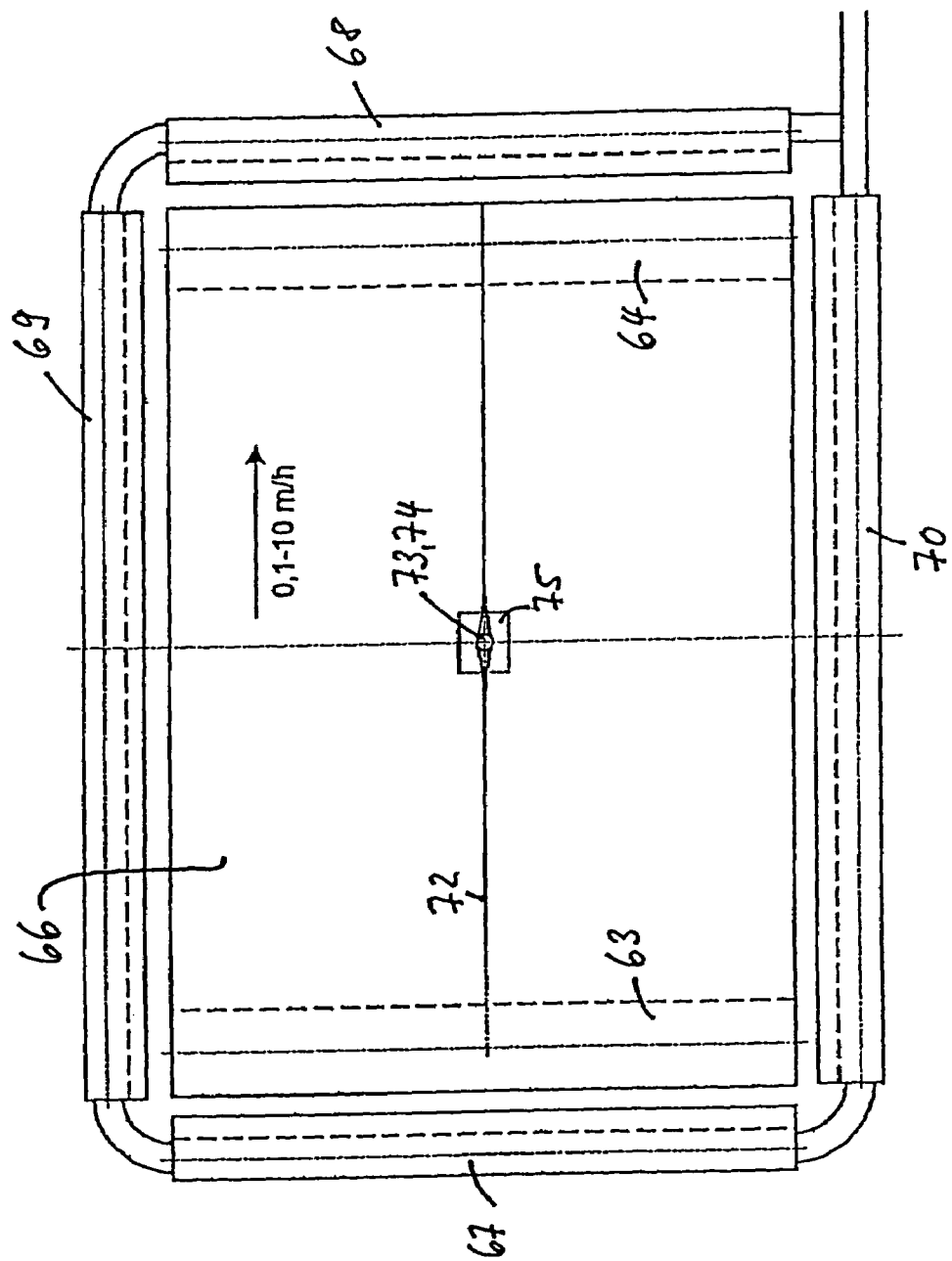
FIG. 5 shows a cross-section section at plane B-B in FIG. 4 through the mobile spray booth.

Reference will now be made to FIG. 5 which illustrates the cross-section at B-B of the spray booth 60 as shown in FIG. 4. FIG. 5 shows, in particular, the edge of the lower wind-off roller 63, the edge of the lower wind-up roller 64, the lower film or paper web 66, the slit 72 produced by means of a blade (shown as blade 71 in FIG. 4). It is through this slit 72 that the discharge tube 73 and the spray nozzle of the mixing head 75 traverse, and the suction devices 67, 68, 69, and 70 are arranged at the narrow sides of the spray booth.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the continuous production of polyurethane sandwich elements comprising an upper outer layer, a lower outer layer, and a layer of cellular polyurethane lying in between the outer layers and which is firmly bonded to the outer layers, and which comprises a circulating upper belt for guiding the upper outer layer, a circulating lower belt for guiding the lower outer layer, a feed device for feeding the upper outer layer onto the circulating upper belt, a feed device for feeding the lower outer layer onto the circulating lower belt, a first mixing head arranged above the lower outer layer to apply the polyurethane reaction mixture to the lower outer layer, a second mixing head arranged below the upper outer layer to apply the polyurethane reaction mixture to the upper outer layer, a metering device to meter the reaction components to the first mixing head, to the second mixing head, and to the lines between the metering device and the first and the second mixing heads, with the second mixing head being a spray mixing head wherein the spray zone in which the scattered mists caused by the spraying polyurethane foam forming reaction mixture are demarcated from the environment by films or paper webs, wherein said films or paper webs are moved in a direction perpendicular to the direction of the movement of the upper layer.

2. The apparatus of claim 1, additionally comprising a length-cutting device for the polyurethane sandwich element.

3. The apparatus of claim 1, in which the films or paper webs are moved at an average advance of 0.1 to 10 m/h, and this movement is either continuous or intermittent.

4. The apparatus of claim 3, in which the films or paper webs are in a plane parallel to the upper outer layer and in which suction devices are arranged at the open narrow sides of the spray zone.

5. The apparatus of claim 4, having a total of four suction devices, with the first two suction devices being arranged such that these are on opposite sides of the spray mixing head with one suction device being at the open narrow side of the spray zone close to the outer edges of the upper outer layer, and the last two suction devices being arranged such that these are on opposite sides of the spray mixing head with one suction device being in front of the spray mixing head and the other being behind the spray mixing head.

6. The apparatus of claim 1, in which the second mixing head oscillates transversely to the direction of movement of the upper outer layer, with the translatory distance covered by the second mixing head being adjustable, and in which the second mixing head swivels outwardly at the end points of the distance covered.

7. The apparatus of claim 1, in which the second mixing head and, optionally, the films or paper webs which limit the spray region can be moved away or swivelled away.

8. The apparatus of claim 1, in which the metering device for each reaction component comprises only one common metering unit with which the reaction component is conveyed to the first and to the second mixing head, and one flow distributor with which the metered material flow of reaction component is distributed to the first and the second mixing head.

9. The apparatus of claim 8, in which the metering units and flow distributors are adjustable.

10. The apparatus of claim 1, additionally comprising means for injecting additional auxiliary substances in which the means for injecting are arranged in the lines between the metering device and the first and/or the second mixing heads.

* * * * *